United States Patent
Masse et al.

(10) Patent No.: US 10,618,132 B2
(45) Date of Patent: Apr. 14, 2020

(54) METHOD FOR THE LASER WELDING OF MONOLITHIC SEMI-FINISHED PRODUCTS MADE FROM ALUMINIUM ALLOY, WITHOUT FILLER WIRE, AND CORRESPONDING STRUCTURAL COMPONENT AND TAILORED BLANK

(71) Applicant: CONSTELLIUM NEUF-BRISACH, Biesheim (FR)

(72) Inventors: Jean-Philippe Masse, Grenoble (FR); Ravi Shahani, Voreppe (FR)

(73) Assignee: Constellium Neuf-Brisach, Biesheim (FR)

( * ) Notice: Subject to any disclaimer, the term of this patent is extended or adjusted under 35 U.S.C. 154(b) by 321 days.

(21) Appl. No.: 15/741,072

(22) PCT Filed: Jun. 30, 2016

(86) PCT No.: PCT/FR2016/051648
§ 371 (c)(1),
(2) Date: Dec. 29, 2017

(87) PCT Pub. No.: WO2017/001790
PCT Pub. Date: Jan. 5, 2017

(65) Prior Publication Data
US 2018/0185962 A1    Jul. 5, 2018

(30) Foreign Application Priority Data
Jul. 2, 2015 (FR) .................... 15 56273

(51) Int. Cl.
*B23K 26/26* (2014.01)
*C22C 21/02* (2006.01)
(Continued)

(52) U.S. Cl.
CPC ............ *B23K 26/26* (2013.01); *B23K 26/22* (2013.01); *B23K 26/244* (2015.10); *B23K 26/32* (2013.01);
(Continued)

(58) Field of Classification Search
CPC ...... B23K 26/26; B23K 26/244; B23K 26/22; B23K 26/32; C22C 21/02
(Continued)

(56) References Cited

U.S. PATENT DOCUMENTS

| 2005/0028894 A1 | 2/2005 | Hoffmann et al. |
| 2005/0100473 A1 | 5/2005 | Ikuno et al. |
| 2005/0155676 A1 | 7/2005 | Cosse et al. |

FOREIGN PATENT DOCUMENTS

| EP | 1380380 A2 | 1/2004 |
| JP | H07 109537 A | 4/1995 |
| JP | 2006104580 A | 4/2006 |

*Primary Examiner* — Christine J Skubinna
(74) *Attorney, Agent, or Firm* — MCBEE MOORE & VANIK IP, LLC (57) ABSTRACT

The invention relates to a method for the laser welding of monolithic semi-finished products made from aluminium alloy, without filler wire, known to the person skilled in the art as "remote laser welding", comprising the following steps: supplying at least two aluminium alloy semi-finished products, of which at least one is a rolled sheet of composition (wt.-%): Si: 2.5-14, preferably 2.7-5.0; Fe: 0.05-0.80, preferably 0.15-0.60; Cu: ≥0.20, preferably ≥0.10, also <0.05, and even <200, also 100 ppm; Mg: 0.05-0.80, preferably 0.20-0.40; Mn: ≥0.70, preferably ≥0.30; Cr: <0.35; Ti: 0.02-0.30; Sr up to 500 ppm; Na up to 200 ppm; Sb up to 0.15%, other elements <0.05 each and <0.15 total, remainder aluminium, on the condition that A: 5.2 Fe+1.95 Si−0.5 Cu−Mg≥7.0; and welding semi-finished products (Continued)

made from aluminium alloy, without filler wire, a method known the person skilled in the art as "remote laser welding".

15 Claims, 4 Drawing Sheets

(51) Int. Cl.
*B23K 26/22* (2006.01)
*B23K 26/244* (2014.01)
*B23K 26/32* (2014.01)
*B23K 103/10* (2006.01)
*B23K 101/18* (2006.01)
*B23K 101/00* (2006.01)

(52) U.S. Cl.
CPC ........ *C22C 21/02* (2013.01); *B23K 2101/006* (2018.08); *B23K 2101/185* (2018.08); *B23K 2103/10* (2018.08)

(58) Field of Classification Search
USPC .................................................. 219/121.64
See application file for complete search history.

METHOD FOR THE LASER WELDING OF MONOLITHIC SEMI-FINISHED PRODUCTS MADE FROM ALUMINIUM ALLOY, WITHOUT FILLER WIRE, AND CORRESPONDING STRUCTURAL COMPONENT AND TAILORED BLANK

CROSS-REFERENCE TO RELATED APPLICATIONS

This application is a National Stage entry of International Application No. PCT/FR2016/051648, filed 30 Jun. 2016, which claims priority to French Patent Application No. 1556273, filed 2 Jul. 2015. The disclosures of the priority applications are incorporated in their entirety herein by reference.

BACKGROUND

Field of The Invention

The invention relates to the domain of parts formed by stamping or extrusion for automobiles, particularly parts assembled by remote laser welding without filler wire. More particularly it relates to aluminium alloy parts in the AA6xxx family according to the "Aluminum Association" designation, to which hardening elements have been added and for use in manufacturing by stamping of inner parts, structural parts or stiffeners for the body-in-white of automobile vehicles.

Description of Related Art

In preamble, in the following and unless mentioned otherwise, all aluminium alloys concerned are designated by the designations defined by the "Aluminum Association" in the "Registration Record Series" that it publishes regularly. Unless mentioned otherwise, indications about the chemical composition of alloys are expressed as a percent of weight based on the total weight of the alloy; "ppm" means parts per million by weight.

The definitions of the metallurgical tempers are indicated in European standard EN 515.

Static mechanical properties in tension, in other words the ultimate strength Rm, the conventional yield stress at 0.2% elongation $Rp_{0.2}$, and the elongation at failure A %, are determined by a tensile test according to standard NF EN ISO 6892-1.

Aluminium alloys are increasingly used in the manufacture of automobile vehicles because their use can reduce the weight of vehicles and thus reduce fuel consumption and the release of greenhouse gases.

Aluminium alloy sheets are currently used for the manufacture of many "body-in-white" parts including skin and bodywork parts (or external bodywork panels) such as the front wings, roof, bonnet (hood), boot (trunk) and door skins, inner parts for example such as inner door, wing, rear door and bonnet parts; and finally structural parts for example side members, front shields, load bearing floors and front, middle and rear foot rests.

Many skin and inner parts are already made using aluminium alloy sheets.

For this type of application, there are several sometimes antagonistic required properties, such as:

high formability in the delivery temper T4, particularly for stamping operations, a controlled yield stress in the delivery temper of the sheet to control elastic springback when shaping, high mechanical strength after cataphoresis and baking of paints to obtain good mechanical strength in service while minimising the weight of the part, good energy absorption capacity in case of impact, good behaviour in the various assembly processes used in automobile bodywork such as spot welding, laser welding, bonding, and even clinching or riveting, good resistance to corrosion, particularly intergranular corrosion, stress corrosion and filiform corrosion of the finished part, compatibility with recycling requirements for fabrication waste or waste from recycled vehicles, an acceptable cost for production in large series.

There are no solutions in prior art consisting of monolithic sheets that can be assembled by remote laser welding without added filler wire and that have mechanical, formability and corrosion characteristics similar to aluminium alloy sheets currently used in the automobile industry.

Figure 1:
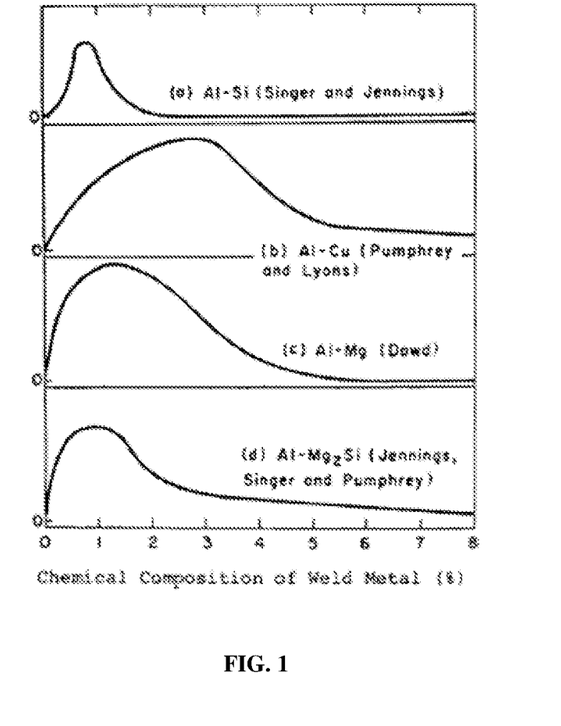
FIG. 1 represents the effect of the chemical composition of the welded metal on the "relative susceptibility" to cracking, or the sensitivity to cracking for various binary alloys.

Furthermore, known solutions particularly to reduce the sensitivity of aluminium alloys to cracking and that could more generally improve their weldability are to increase the contents of silicon to above 2%, magnesium to above 5%, and copper to above 6% (see FIG. 1).

In the case of alloys in the AA6XXX series, a filler wire is used to provide good resistance to cracking during laser welding; the filler wire is composed of an alloy in the AA4XXX series with high silicon content (for example 12%) or an alloy in the AA5XXX series. It is also known that elements such as Titanium and Zirconium can be used to refine the solidification structure and consequently reduce the sensitivity to cracking during laser welding, as reported in "Current issues and problems in laser welding of automotive aluminum alloys", H. Zhao, D. R. White, and T. DebRoy, International Materials Reviews, Volume 44, Issue 6 (1 Jun. 1999), pp. 238-266, from which FIG. 1 is extracted.

Figure 2:
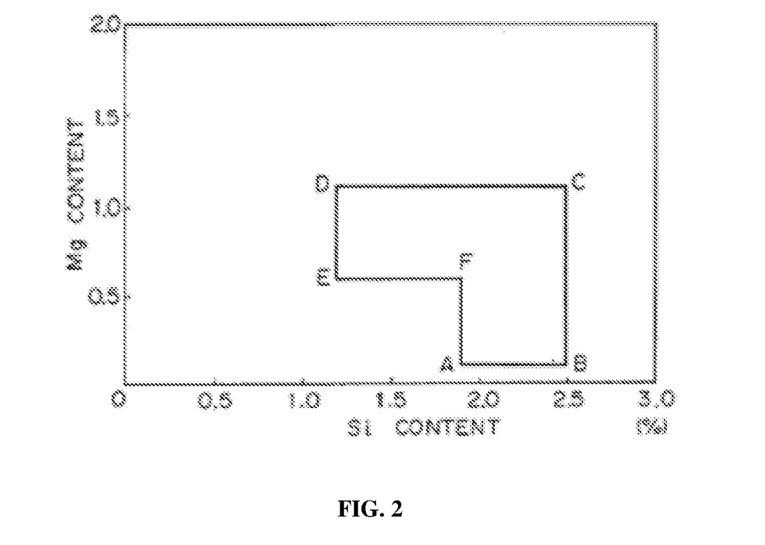
FIG. 2 represents the domain of the composition claimed by "Sky" in application U.S. Pat. No. 4,897,124.

Although, as mentioned above, there is no known solution in prior art for assembly of a monolithic sheet, in other words a non-composite sheet composed of two co-rolled alloys or obtained by a "bi-alloy" casting, for assembly of automobiles by laser welding, a monolithic sheet has been developed by "Sky" for application to arc welding using the TIG and MIG processes and is disclosed in application U.S. Pat. No. 4,897,124. The range of composition of said sheet is defined on FIG. 2, with an Fe content of between 0.05% and 0.5% and at least one element from the following group: Mn with a content of less than 0.6%, Cr with a content of less than 0.3% and Zr also with a content of less than 0.3%. Improved weldability is claimed, together with improved formability and resistance to corrosion.

Furthermore, a multilayer product has been developed by "Novelis" as reported in "Advanced Aluminum 5XXX and 6XXX for complex Door Inner Panels and Consideration for an Aluminum-specific Design", A. Walker, G. Florey—Novelis Switzerland SA; Bad Nauheim—Doors and Closures in Car Body Engineering 2014 and "Laser Remote Welding of Aluminum without filler", R. Brockmann (Trumpf), C. Bassi (Novelis) 2012 Apr. 19.

This is an assembly composed of a core sheet made of "Novelis 6200" alloy, cladded with sheets made of an alloy in the AA4XXX family (with a 12% content of Si, slightly below the Al—Si eutectic [see Laser Remote Welding of Aluminum without filler; R. Brockmann (Trumpf), C. Bassi (Novelis) 2012 Apr. 19]) on the surface. Its trade name is 6200RW or "Novelis Advanz s200 RW". It has improved weldability during remote laser welding without filler wire, with no crack in the welded joint as stated in "Laser Remote Welding of Aluminum without filler", R. Brockmann (Trumpf), C. Bassi (Novelis) 2012 Apr. 19. However this type of monolithic product is not ideal in terms of cost and recycling.

Patent application JP2006104580 discloses an aluminium alloy sheet in the 3XXX series with good pulsed laser weldability, with composition as a % by weight, Si: >0.20 to 0.60, Fe: 0.25 to 0.55, Cu: 0.10 to 0.35, Mn: 0.9 to 1.5, Mg: 0.25 to 0.55, remainder aluminium and inevitable impurities, the total value of Si, Fe, Cu and Mg being less than or equal to 1.5% by weight. These sheets made of 3XXX alloy do not have the required mechanical characteristics.

Patent application US2005/0155676 describes safety or structural parts obtained by die-casting made from an alloy containing Si: 2 to 6, Mg<0.40, Cu<0.30, Zn<0.30, Fe<0.50, Ti<0.30, at least one element to reduce the bond with the mould such as Mn (0.3-2), Cr (0.1-0.3) Co (0.1-0.3) V (0.1 to 0.3) or Mo (0.1-0.4) and at least one element to modify the eutectics such as Sr (50-500 ppm), Na (20-100 ppm) or Ca (30-120 ppm). These cast products do not have the required geometric and mechanical characteristics Patent application JP 1995109537 discloses a hypo-eutectic Al—Si alloy that can be used for cast, extruded and forged products that have the following composition as a % by weight, Si: 3.3-5.5, Mg: 0.2-0.7, Ti: 0.01-0.2, B: 0.0001-0.01, Fe≤0.2, P≤0.005 and Ca≤0.005 and satisfying the relation P/Ca≤1.0 by weight. These products do not have the required geometric and mechanical characteristics Patent application US2005/0100473 describes aluminium alloys and cast products containing the following % by weight, Si: 4-12, Cu<0.2, Mg: 0.1-0.5, Ni: 0.2-3.0, Fe: 0.1-0.7, Ti: 0.15-0.3 and the remainder aluminium and impurities. These cast products do not have the required geometric and mechanical characteristics Problem that Arises Aluminium alloys in the AA6XXX series are widely used in the automobile industry and are known to be very sensitive to cracking during assembly by laser welding, particularly causing critical cracks in the welded bead.

The problem that arises is to develop an aluminium alloy sheet that does not form critical cracks during assembly by laser welding without a filler wire. This aluminium alloy sheet must have the same mechanical strength, formability and corrosion performances as currently used aluminium alloys. Mechanical characteristics of the sheet are preferably as follows, in the T4 delivery temper, $Rp_{0.2} \leq 160$ MPa, Ag≥18%, A80≥20%, and after baking the paint (strain hardening by 2% tension followed by 20 minutes at 180° C.), $Rp_{0.2} \geq 190$ MPa and Rm≥240 MPa.

SUMMARY

The purpose of the invention is a method for remote laser welding of monolithic semi-finished products made from aluminium alloy, without filler wire, comprising the following steps:
Supply of at least two monolithic semi-finished products made of aluminium alloy, at least one of which is a rolled sheet with composition (% by weight):
Si: 2.5-14 preferably 2.5-10.0, more preferably 2.7-5.0;
Fe: 0.05-0.80 preferably 0.15-0.60
Cu: ≤0.20 preferably ≤0.10 or even ≤0.05, and ≤200 ppm or even 100 ppm
Mg: 0.05-0.8 preferably 0.20-0.80, more preferably 0.20-0.40
Mn: ≤0.70 preferably ≤0.30
Cr: ≤0.35
Ti: 0.02-0.30
Sr up to 500 ppm
Na up to 200 ppm
Sb up to 0.15%,
other elements <0.05 each and <0.15 total, remainder aluminium, with the condition: 5.2 Fe+1.95 Si−0.5 Cu−Mg≥7.0
Weld the semi-finished aluminium alloy products by laser remote welding without filler wire.

According to one preferred embodiment, said semi-finished products form automobile structure components, or even automobile body-in-white components, including automobile vehicle skin components also automobile vehicle door components.

Finally, the purpose of the invention also includes a component of the structure, the body-in-white, the skin or door of an automobile vehicle composed of several semi-finished products, of which at least one has a composition and is assembled using a method as defined above.

Another purpose of the invention is a tailored blank obtained by the method according to the invention.

DETAILED DESCRIPTION OF A PREFERRED EMBODIMENT

The method according to the invention comprises the procurement of monolithic semi-finished products made of aluminium alloy, typically rolled sheets or extruded sections. At least one of the semi-finished products is a rolled sheet. In one embodiment of the invention, at least two of the two semi-finished products are rolled sheets. In another embodiment of the invention, at least one second semi-finished product is an extruded section.

The method of manufacturing monolithic sheets typically comprises casting, reheating/homogenisation, hot rolling, cold rolling, solution heat treatment and quenching.

Casting is usually a semi-continuous vertical type of casting of sheets followed by scalping, or is possibly of the continuous type.

Plates are typically heated to a temperature of the order of 550° C. for at least 4 hrs, so as to globulise excess silicon particles when the silicon content is more than 1.2%, and to obtain circular-shaped particles distributed horizontally throughout the thickness of the sheet. This temperature is advantageously between the solvus and the solidus of the alloy considered.

After reheating, the sheets are typically hot rolled and then cold rolled. Hot rolling is not different from hot rolling of an alloy in the AA6XXX family used for example for door stiffeners.

Solution heat treatment, after cold rolling, is typically done at a temperature of the order of 550° C., so as to recrystallise and return all the Mg and free Si into solution, before quenching. This temperature is advantageously between the solvus and the solidus of the alloy, as for reheating.

In the case in which a second semi-finished product is an extruded section, the typical manufacturing steps are similar:

Casting of billets is also generally of the semi-finished vertical type possibly followed by scalping.

Billets are heated before or after cutting to length typically to a temperature of the order of 550° C. This temperature is advantageously between the solvus and the solidus of the alloy considered.

After reheating, the billets are extruded with solution heat treatment and quenching on press or separately.

In the latter case, solution heat treatment is typically done at a temperature of the order of 550° C., so as to return all the Mg and free Si into solution, before quenching. This temperature is ideally between the solvus and the solidus of the alloy, as for reheating.

The chemical composition of said rolled sheet in the method according to the invention is (% by weight):

Si: 2.5-14 preferably 2.5-10.0, more preferably 2.7-5.0
Fe: 0.05-0.80 preferably 0.15-0.60
Cu: ≤0.20 preferably ≤0.10 or even ≤0.05, and ≤200 ppm or even 100 ppm
Mg: 0.05-0.8 preferably 0.20-0.80, more preferably 0.20-0.40
Mn: ≤0.70 preferably ≤0.30
Cr: ≤0.35
Ti: 0.02-0.30
Sr up to 500 ppm
Na up to 200 ppm
Sb up to 0.15%,
other elements <0.05 each and <0.15 total, remainder aluminium, with the condition: 5.2 Fe+1.95 Si−0.5 Cu−Mg≥7.0

The concentration ranges imposed on the constituents of this type of alloy can be explained by the following reasons:

Si: The presence of a minimum content of silicon equal to 2.5% can significantly improve weldability. Beyond a content of 5%, the formability begins to decrease and becomes problematic for contents above 14% and in some cases above 10.0%.

A preferred content of silicon is from 2.7 to 5.0%.

Fe: A minimum Fe content of 0.05% unexpectedly improves weldability, while at contents of above 0.80%, formability is significantly degraded.

A preferred content of iron is from 0.15 to 0.60%.

Furthermore, the applicant has noted that the condition "5.2 Fe+1.95 Si−0.5 Cu−Mg≥7.0, subsequently referred to as "Condition A", is particularly favourable for weldability. In this expression, "Fe", "Si", "Cu" and "Mg" denote the contents of iron, silicon, copper and magnesium respectively expressed as a % by weight.

Cu: Beyond a content of 0.20%, weldability is significantly degraded. The copper content is preferably ≤0.10% or even ≤0.05, or even ≤200 or even 100 ppm Mg: A minimum content of Mg equal to 0.05% and preferably 0.20% is necessary for the sufficient formation of $Mg_2Si$ precipitates to obtain the required mechanical properties after baking of the paint. Its negative influence on welding imposes a limitation to a maximum content of 0.80%.

A preferred content of magnesium is from 0.20 to 0.40%.

Cr: Its content is limited to 0.35%.

An addition of 0.05% or more has a hardening effect, but beyond 0.35%, chromium forms harmful intermetallic phases.

A preferred content of chromium is from 0.05 to 0.25%.

Mn: its content is limited to 0.70%. An addition of manganese beyond 0.05% can improve mechanical characteristics through the solid solution effect, but beyond 0.70%, it very strongly reduces formability, a phenomenon, that was already perceptible above 0.30%. A preferred content of Mn is from 0.05 to 0.30%. In one embodiment of the invention, the maximum content of Mn is 0.2%.

Ti: It has been noted that the effect of this element is to refine the solidification structure and therefore reduce the sensitivity to cracking. Therefore a minimum content of Ti of 0.02% is necessary. On the other hand, a maximum content of 0.30% has to be imposed to avoid forming primary phases during vertical casting, which have a harmful effect on the mechanical characteristics and on formability.

Sr: the addition of Sr is optional. For a content of less than 500 ppm, it acts on the Al—Si eutectic form during solidification, favours obtaining circular-shaped Si particles distributed uniformly after reheating and before hot rolling. At higher contents, its effect on gassing of the cast sheet become significant.

A preferred content of strontium is from 200 to 400 ppm.

The use of other elements called "modifiers" such as sodium Na at contents of up to 200 ppm (preferably from 20 to 200 ppm) or antimony Sb at contents of up to 0.15% (preferably from 0.04 to 0.15%) is also possible.

A preferred content of Na is from 20 to 200 ppm.

A preferred content of Sb is from 0.04 to 0.15%.

In one advantageous embodiment, the addition of Sr alone is chosen.

Mechanical characteristics of the rolled sheet used for the method according to the invention are advantageously as follows, in the T4 delivery temper, $Rp_{0.2} \leq 160$ MPa, Ag≥18%, A80≥20%, and after strain hardening by 2% tension followed by 20 minutes at 180° C., treatment representative of baking paint, $Rp_{0.2} \geq 170$ MPa and preferably $Rp_{0.2} \geq 190$ MPa and Rm≥240 MPa. Preferably, the thickness of the rolled sheet used is between 0.5 mm and 3 mm and preferably it is between 1 and 2 mm.

Figure 3:
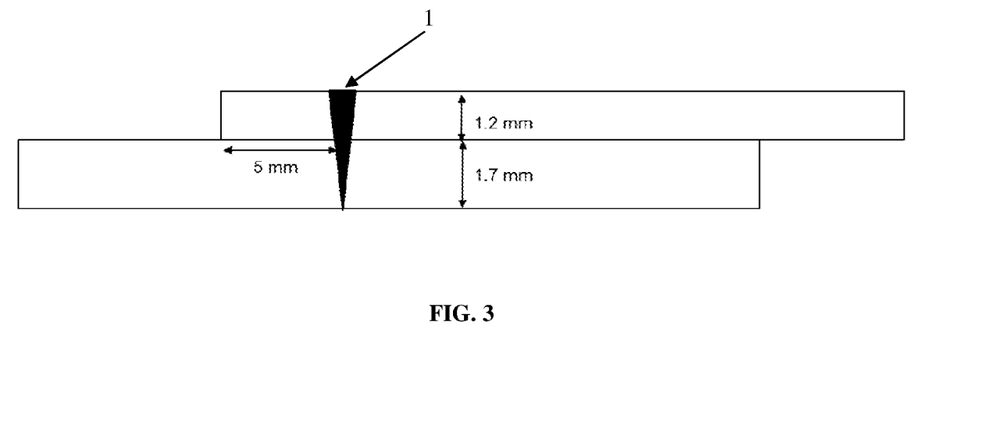
FIG. 3 diagrammatically illustrates a typical configuration of a laser welding device seen in a cross-section, with the laser bead shown as 1.
Figure 7:
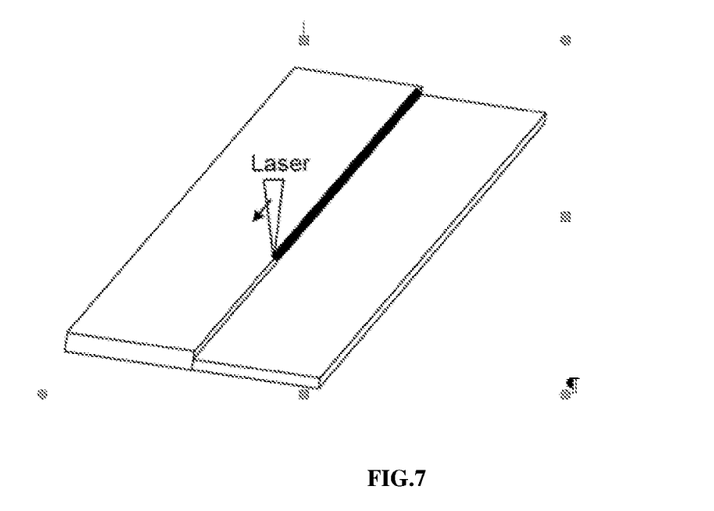
FIG. 7 diagrammatically illustrates a butt weld device configuration for manufacturing a tailored blank.

The method according to the invention can be used particularly for welding by superposition, as illustrated on FIG. 3 or for a butt welding configuration as illustrated in FIG. 7. It has also been observed that the tendency to cracking is significantly less when said rolled sheet with the composition according to the invention is placed above the other semi-finished product(s) during welding, namely on the side of the impact of the laser beam. This advantage is obtained in the case of welding by superposition. Thus in one advantageous embodiment, the rolled sheet with the composition according to the invention is positioned on the side of the impact of the laser beam.

Advantageously, the butt welding configuration can result in a tailored blank after welding, preferably characterised in that at least two of said semi-finished products have different thicknesses and/or different mechanical strengths after butt welding. The invention also relates to a tailored blank composed of several semi-finished products, at least one of which is a rolled sheet with a composition according to the invention and being assembled by butt welding using a welding method without filler wire according to the invention. The tailored blanks according to the invention are advantageous and in particular have an "Rm after welding to Rm in the delivery temper T4" ratio of more than 0.8, Rm after welding being measured on test pieces taken in the direction perpendicular to the rolling direction, as illustrated on FIG. 8.

The essential advantage of the invention is the possibility of using a monolithic rolled sheet with improved weldability, particularly during remote laser welding without filler wire, welding method generally known to an expert in the subject as "Remote Laser Welding" and formability and corrosion resistance properties at least comparable to those of alloys in the AA6XXX family classically used for automobile parts.

Target applications cover structural parts and also body-in-white, skin and door parts.

The method according to the invention in which said semi-finished products form automobile structure components or automobile body-in-white components, or automobile vehicle skin components or automobile vehicle door component, is advantageous.

EXAMPLES

Tested chemical compositions are summarised in Table 1 below:

TABLE 1

| | Alloy element (% by weight) | | | | | | | | | |
|---|---|---|---|---|---|---|---|---|---|---|
| Reference | Si | Fe | Condition A | Cu | Mn | Mg | Cr | Zn | Ti | Sr |
| 1 (Invention) | 3.44 | 0.24 | 7.7 | 0.060 | 0.10 | 0.25 | 0 | 0 | 0.02 | 0 |
| 2 (Invention) | 3.39 | 0.24 | 7.5 | 0.200 | 0.10 | 0.24 | 0 | 0 | 0.03 | 0 |
| 3 (Invention) | 3.26 | 0.18 | 7.0 | 0.020 | 0.10 | 0.25 | 0.10 | 0.032 | 0.14 | 0 |
| 4 | 3.36 | 0.15 | 6.9 | 0 | 0.10 | 0.45 | 0.10 | 0 | 0.13 | 0 |
| 5 | 1.28 | 0.14 | | 0.018 | 0.10 | 0.43 | 0.10 | 0.028 | 0.02 | 0 |
| 6 (Invention) | 3.46 | 0.26 | 7.8 | 0 | 0.10 | 0.25 | 0 | 0.032 | 0.14 | 0.03 |
| 7 | 1.27 | 0.24 | | 0 | 0.10 | 0.44 | 0.10 | 0 | 0.15 | 0 |
| 8 | 1.27 | 0.25 | | 0 | 0.10 | 0.24 | 0.10 | 0.030 | 0.01 | 0 |
| 9 | 1.30 | 0.15 | | 0.020 | 0.10 | 0.25 | 0 | 0 | 0.15 | 0 |
| 10 | 3.30 | 0.25 | | 0.020 | 0.10 | 0.25 | 0.10 | 0 | 0.01 | 0.03 |
| 11 (Invention) | 3.29 | 0.24 | 7.2 | 0.020 | 0.10 | 0.44 | 0 | 0 | 0.02 | 0 |
| 12 | 3.44 | 0.16 | | 0 | 0.10 | 0.45 | 0 | 0.033 | 0.01 | 0.03 |
| 13 | 1.27 | 0.24 | | 0.019 | 0.10 | 0.44 | 0 | 0.033 | 0.15 | 0 |
| 14 | 1.26 | 0.14 | | 0 | 0.11 | 0.24 | 0 | 0 | 0.02 | 0 |
| 15 (Invention) | 3.50 | 0.24 | 7.3 | 0 | 0.10 | 0.80 | 0 | 0.035 | 0.14 | 0.03 |
| 16 | 3.30 | 0.26 | 6.9 | 0.021 | 0.10 | 0.83 | 0.10 | 0 | 0.02 | 0.03 |
| 17 | 1.97 | 0.40 | | 0.021 | 0.10 | 0.25 | 0.10 | 0 | 0.10 | 0 |
| 18 (Invention) | 2.73 | 0.41 | 7.2 | 0.021 | 0.11 | 0.25 | 0.11 | 0 | 0.11 | 0 |
| 19 (Invention) | 3.47 | 0.40 | 8.6 | 0.021 | 0.10 | 0.25 | 0.10 | 0 | 0.24 | 0 |
| 20 (Invention) | 4.52 | 0.42 | 10.7 | 0.021 | 0.10 | 0.25 | 0.10 | 0 | 0.11 | 0 |
| 21 | 2.74 | 0.25 | 6.4 | 0.019 | 0.12 | 0.25 | 0.10 | 0 | 0.11 | 0 |
| 22 (Invention) | 2.71 | 0.59 | 8.1 | 0.024 | 0.12 | 0.24 | 0.10 | 0 | 0.11 | 0 |
| 23 (Invention) | 2.74 | 0.39 | 7.1 | 0.048 | 0.10 | 0.25 | 0.10 | 0 | 0.10 | 0 |
| 24 (Invention) | 2.78 | 0.40 | 7.2 | 0.100 | 0.10 | 0.24 | 0.10 | 0 | 0.10 | 0 |
| 25 | 1.18 | 0.16 | | 0.132 | 0.07 | 0.35 | 0.01 | 0 | 0.01 | 0 |
| 26 | 1.18 | 0.16 | | 0.128 | 0.07 | 0.35 | 0.01 | 0 | 0.03 | 0 |

It will be noted that references 25 and 26 correspond to AA6016 type alloys very frequently used in automobile bodywork.

Manufacturing/Process parameters are summarised in Table 2 below:

TABLE 2

| | Process parameters | | | | | | | | | | |
|---|---|---|---|---|---|---|---|---|---|---|---|
| Reference | Reheating temperature (° C.) | reheating hold time (h) | Hot rolling start temperature (° C.) | Hot rolling end temperature (° C.) | thickness after hot rolling (mm) | thickness after cold rolling (mm) | Solution heat treatment temperature (° C.) | Solution heat treatment temperature hold time (s) | End of quench temperature (° C.) | Pre-tempering temperature (° C.) | Pre-tempering time (h) |
| 1 | 550 | 4 | 530 | 280 | 6 | 1.2/1.7 | 550 | 120 | 85 | 85 | 8 |
| 2 | 550 | 4 | 530 | 280 | 6 | 1.2/1.7 | 550 | 120 | 85 | 85 | 8 |
| 3 | 550 | 4 | 530 | 280 | 6 | 1.2/1.7 | 550 | 120 | 85 | 85 | 8 |
| 4 | 550 | 4 | 530 | 280 | 6 | 1.2/1.7 | 550 | 120 | 85 | 85 | 8 |
| 5 | 550 | 4 | 530 | 280 | 6 | 1.2/1.7 | 550 | 120 | 85 | 85 | 8 |
| 6 | 550 | 4 | 530 | 280 | 6 | 1.2/1.7 | 550 | 120 | 85 | 85 | 8 |

TABLE 2-continued

Process parameters

| Reference | Reheating temperature (° C.) | reheating hold time (h) | Hot rolling start temperature (° C.) | Hot rolling end temperature (° C.) | thickness after hot rolling (mm) | thickness after cold rolling (mm) | Solution heat treatment temperature (° C.) | Solution heat treatment temperature hold time (s) | End of quench temperature (° C.) | Pre-tempering temperature (° C.) | Pre-tempering time (h) |
|---|---|---|---|---|---|---|---|---|---|---|---|
| 7  | 550 | 4 | 530 | 280 | 6 | 1.2/1.7 | 550 | 120 | 85 | 85 | 8 |
| 8  | 550 | 4 | 530 | 280 | 6 | 1.2/1.7 | 550 | 120 | 85 | 85 | 8 |
| 9  | 550 | 4 | 530 | 280 | 6 | 1.2/1.7 | 550 | 120 | 85 | 85 | 8 |
| 10 | 550 | 4 | 530 | 280 | 6 | 1.2/1.7 | 550 | 120 | 85 | 85 | 8 |
| 11 | 550 | 4 | 530 | 280 | 6 | 1.2/1.7 | 550 | 120 | 85 | 85 | 8 |
| 12 | 550 | 4 | 530 | 280 | 6 | 1.2/1.7 | 550 | 120 | 85 | 85 | 8 |
| 13 | 550 | 4 | 530 | 280 | 6 | 1.2/1.7 | 550 | 120 | 85 | 85 | 8 |
| 14 | 550 | 4 | 530 | 280 | 6 | 1.2/1.7 | 550 | 120 | 85 | 85 | 8 |
| 15 | 550 | 4 | 530 | 280 | 6 | 1.2/1.7 | 550 | 120 | 20 | 85 | 8 |
| 16 | 550 | 4 | 530 | 280 | 6 | 1.2/1.7 | 550 | 120 | 20 | 85 | 8 |
| 17 | 550 | 4 | 530 | 280 | 6 | 1.2/1.7 | 550 | 120 | 20 | 85 | 8 |
| 18 | 550 | 4 | 530 | 280 | 6 | 1.2/1.7 | 550 | 120 | 20 | 85 | 8 |
| 19 | 550 | 4 | 530 | 280 | 6 | 1.2/1.7 | 550 | 120 | 20 | 85 | 8 |
| 20 | 550 | 4 | 530 | 280 | 6 | 1.2/1.7 | 550 | 120 | 20 | 85 | 8 |
| 21 | 550 | 4 | 530 | 280 | 6 | 1.2/1.7 | 550 | 120 | 20 | 85 | 8 |
| 22 | 550 | 4 | 530 | 280 | 6 | 1.2/1.7 | 550 | 120 | 20 | 85 | 8 |
| 23 | 550 | 4 | 530 | 280 | 6 | 1.2/1.7 | 550 | 120 | 20 | 85 | 8 |
| 24 | 550 | 4 | 530 | 280 | 6 | 1.2/1.7 | 550 | 120 | 20 | 85 | 8 |
| 25 | 550 | 4 | 530 | 280 | 6 | 1.2/1.7 | 550 | 120 | 20 | 85 | 8 |
| 26 | 550 | 4 | 530 | 280 | 6 | 1.2/1.7 | 550 | 120 | 20 | 85 | 8 |

Welding Tests

Figure 4:
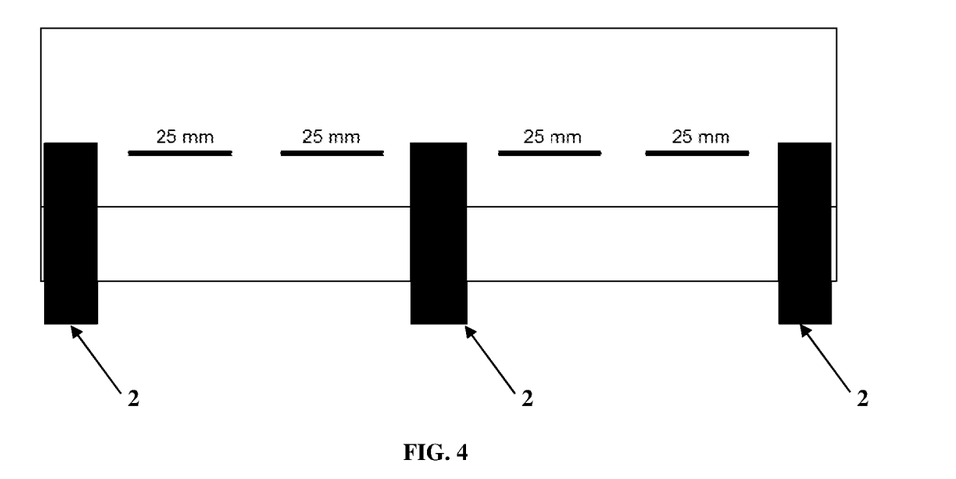
FIG. 4 illustrates the same laser welding device seen in a top view with the attachments or clamps shown in black (2).

Laser welding is done by placing a 1.2 mm sheet over a 1.7 mm sheet with the same chemical composition according to the diagrams shown in FIGS. 3 and 4.

16 weld beads were made for each alloy.

The following laser weld parameters were used:
Laser power: 3 kW
Welding speed: 3.4 m/min
No filler wire
No protective gas.

Evaluation of Cracks:

A cross-section is made on each weld bead.

After coating and polishing, each section is observed in optical microscopy to determine the size of any cracks in the bead.

The average of the 16 sections is then taken to obtain the average crack. The fraction of cracks longer than a given length can also be determined.

In fact, for each alloy, the average crack length, the fraction of cracks with a length of more than 0.2 times the thickness of the upper sheet and the fraction of cracks with a length exceeding 0.4 times the thickness of the upper sheet were determined.

These tests are summarised in Table 3 below:

TABLE 3

| | Welding performance | | |
|---|---|---|---|
| Reference | Average crack length (*1.2 mm) | Fraction of cracks longer than 0.2 * 1.2 mm | Fraction of cracks longer than 0.4 * 1.2 mm |
| 1 (Invention) | 0.25 | 0.44 | 0.19 |
| 2 (Invention) | 0.19 | 0.38 | 0.13 |
| 3 (Invention) | 0.11 | 0.25 | 0 |
| 4 | 0.46 | 0.75 | 0.56 |
| 5 | 1.00 | 1 | 1 |
| 6 (Invention) | 0.08 | 0 | 0 |
| 7 | 0.84 | 0.94 | 0.88 |
| 8 | 0.79 | 0.88 | 0.81 |
| 9 | 0.93 | 1 | 1 |
| 10 | 0.59 | 0.94 | 0.75 |
| 11 (Invention) | 0.42 | 0.75 | 0.38 |
| 12 | 0.64 | 1 | 0.81 |
| 13 | 0.89 | 1 | 1 |
| 14 | 0.86 | 1 | 0.88 |
| 15 (Invention) | 0.33 | 0.56 | 0.31 |
| 16 | 0.54 | 0.88 | 0.63 |
| 17 | 0.53 | 0.75 | 0.56 |
| 18 (Invention) | 0.29 | 0.50 | 0.25 |
| 19 (Invention) | 0.24 | 0.69 | 0.06 |
| 20 (Invention) | 0.06 | 0.00 | 0 |
| 21 | 0.59 | 0.81 | 0.69 |
| 22 (Invention) | 0.14 | 0.31 | 0 |
| 23 (Invention) | 0.44 | 0.69 | 0.50 |
| 24 (Invention) | 0.39 | 0.69 | 0.38 |
| 25 | 0.96 | 1 | 1 |
| 26 | 1 | 1 | 1 |

Firstly, note that keeping properties similar to the properties of an alloy in the classical AA6XXX family when Si is added with a content of the order of 5% or more was a priori unknown in the state of prior art, the applicant did not find any example in the literature relating this effect.

A comparison between examples 17, 18, 19 and 20 shows that increasing the content of Si from approximately 2 to 4.5%, reduces the average crack length from 0.53 to 0.06, and the fraction of cracks with a length of more than 0.2 times the thickness of the upper sheet during welding is reduced from 0.56 to 0.

Furthermore, beyond a content of 1.2%, diamond Si particles measuring up to 10 µm form in the microstructure. No result in the literature reports properties with such chemical compositions and such a microstructure.

Furthermore, this effect of iron on weldability forms another difference from prior art: in particular a comparison between examples 21, 18 and 22 in particular shows the interesting effect of Fe. With a limited content of Si (2.7%), the weldability can be improved by increasing the Fe content from 0.25 to 0.59%; the average crack length reduces from 0.59 to 0.14, and the fraction of cracks with a length of more than 0.4 times the thickness of the upper sheet during welding is reduced from 0.69 to 0, passing through 0.25.

No bibliographic reference provides an explanation for this effect, nor even a proof that iron has a positive effect on reducing the sensitivity to cracking.

mm gauge extensometer and $A_{80}$ elongation values percent measured with an 80 mm gauge extensometer. In the special case of a test piece with the same geometry taken in the same material, the $A_{50}$ value of the elongation percent is higher than the $A_{80}$ value and is given by the following relation: $A_{50}=Ag+(A_{80}-Ag)*80/50$ in which Ag, in %, is the plastic extension at maximum force, also called "generalised elongation" or "elongation at necking".

The results are summarised in Table 4 below.

TABLE 4

| | Mechanical characteristics | | | | | | | |
|---|---|---|---|---|---|---|---|---|
| | T4 | | | | T4 + Bake Paint | | | |
| Reference | $Rp_{0.2}$ (MPa) | Rm (MPa) | Ag (%) | A80 (%) | $Rp_{0.2}$ (MPa) | Rm (MPa) | Ag (%) | A80 (%) |
| 1 (Invention) | 98 | 204 | 18.0 | 20.5 | 192 | 247 | 8.8 | 10.0 |
| 2 (Invention) | 87 | 206 | 21.3 | 27.0 | 205 | 263 | 8.6 | 8.6 |
| 3 (Invention) | 110 | 228 | 20.2 | 23.0 | 190 | 261 | 14.3 | 17.4 |
| 4 | 134 | 277 | 20.7 | 24.6 | 263 | 328 | 13.9 | 17.5 |
| 5 | 133 | 274 | 23.6 | 28.7 | 260 | 322 | 15.0 | 19.0 |
| 6 (Invention) | 90 | 196 | 18.9 | 20.5 | 199 | 268 | 13.4 | 15.7 |
| 7 | 128 | 230 | 21.3 | 22.6 | 264 | 326 | 14.3 | 16.7 |
| 8 | 106 | 221 | 20.3 | 23.9 | 188 | 258 | 13.5 | 15.6 |
| 9 | 102 | 219 | 22.3 | 25.7 | 195 | 261 | 14.0 | 15.7 |
| 10 | 96 | 202 | 21.0 | 24.9 | 195 | 261 | 12.0 | 14.8 |
| 11 (Invention) | 130 | 271 | 20.6 | 24.7 | 245 | 272 | 3.4 | 3.5 |
| 12 | | | | | 248 | 281 | 4.9 | 5.0 |
| 13 | 140 | 277 | 22.1 | 26.7 | 259 | 320 | 13.7 | 15.4 |
| 14 | 77 | 173 | 24.0 | 26.7 | 192 | 245 | 9.6 | 10.7 |
| 15 (Invention) | 156 | 299 | 19.8 | 23.0 | 272 | 331 | 10.2 | 11.2 |
| 16 | 183 | 287 | 19.6 | 22.7 | 299 | 358 | 12.4 | 13.7 |
| 17 | 111 | 238 | 21.7 | 23.9 | 205 | 278 | 14.1 | 16.6 |
| 18 (Invention) | 111 | 238 | 21.7 | 24.1 | 204 | 276 | 14.3 | 17.4 |
| 19 (Invention) | 111 | 237 | 21.7 | 25.1 | 204 | 277 | 13.2 | 15.7 |
| 20 (Invention) | 110 | 237 | 22.0 | 25.3 | 199 | 272 | 14.8 | 19.9 |
| 21 | 108 | 234 | 23.3 | 26.4 | 199 | 273 | 16.1 | 19.9 |
| 22 (Invention) | 112 | 240 | 20.3 | 22.5 | 207 | 280 | 12.9 | 15.4 |
| 23 (Invention) | 111 | 240 | 21.8 | 24.5 | 206 | 277 | 14.1 | 17.0 |
| 24 (Invention) | 112 | 241 | 20.6 | 22.8 | 210 | 282 | 13.8 | 16.5 |
| 25 | 116 | 243 | 25.7 | 28.1 | 229 | 297 | 16.3 | 20.6 |
| 26 | 115 | 242 | 25.1 | 27.8 | 222 | 292 | 17.1 | 21.3 |

Similarly, examples 21, 22 and 23, compared particularly with examples 4, 16 and 21, demonstrate the very positive effect of condition A of welding.

Finally, a comparison between the results in Table 3 for example 19 and for examples 23 and 24 show the negative effect of copper.

Tension Tests

Tension tests were carried out at ambient temperature according to standard NF EN ISO 6892-1 using non-proportional test pieces with geometry frequently used for sheets and corresponding to test piece type 2 in Table B.1 in Appendix B in the standard. These test pieces in particular are 20 mm wide and their calibrated length is 120 mm. The elongation percent after failure is measured using an 80 mm gauge extensometer and is therefore denoted $A_{80}$ according to the standard.

As mentioned in the note in section 20.3 in standard ISO 6892-1:2009(F) (page 19), it is important to note that "comparisons of elongation percent are only possible when the length between marks or the gauge length of the extensometer, the shape and the cross-section are the same, or when the proportionality coefficient k is the same".

In particular, it is impossible to make a direct comparison between $A_{50}$ elongation values percent measured with a 50

It can be seen that the improvement in the weld quality, particularly for examples 3 and 6, and especially 20 and 22, is achieved without any significant change to the mechanical characteristics conditions required in the "Problem that arises" section.

Measurement of the LDH (Limit Dome Height)

These LDH (Limit Dome Height) measurements were made to characterise the stamping performance of the different sheets in this example.

The LDH parameter is widely used to evaluate the stampability of sheets between 0.5 and 3.0 mm thick. There have been many publications on this subject, and particularly that by Thompson, "The LDH test to evaluate sheet metal formability—Final Report of the LDH Committee of the North American Deep Drawing Research Group", SAE conference, Detroit, 1993, SAE Paper No. 930815.

This is a stamping test of a blank fixed around its periphery by a binder frame. The clamping pressure is controlled to prevent sliding in the frame. The blank, with dimensions 120×160 mm, is loaded in a manner similar to plane strain. The punch used is hemispherical.

Figure 5:
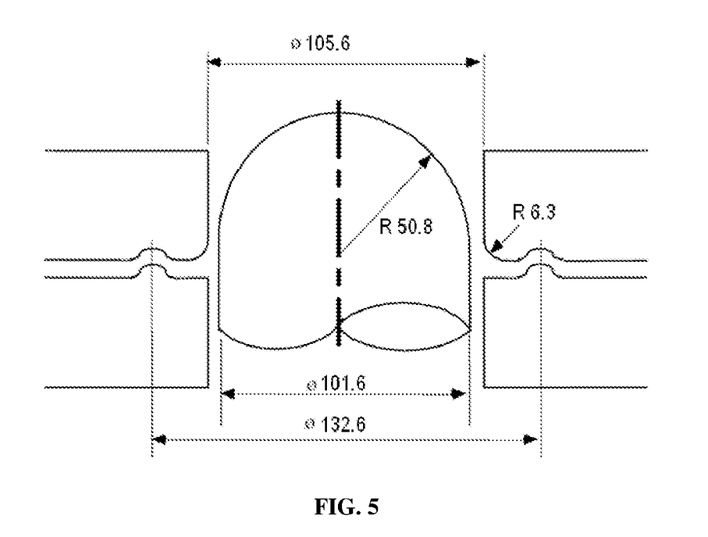
FIG. 5 specifies the dimensions in mm of the tools used to determine the value of the parameter known to an expert in the subject as LDH (Limit Dome Height) characteristic of the stampability of the material.

FIG. 5 shows the dimensions of tools used to perform this test.

Graphite grease (Shell HDM2 grease) is used for lubrication between the punch and the sheet. The punch lowering rate is 50 mm/min. The value referred to as the LDH value is the displacement value of the punch at failure, which is the limiting stamping depth. It is the average of three tests, giving a confidence interval of 95% on the 0.2 mm measurement.

Table 5 below indicates values of the LDH parameter obtained on 120×160 mm test pieces cut out from the above-mentioned 2.5 mm thick sheets and for which the 160 mm dimension was placed parallel to the rolling direction.

TABLE 5

| Reference | Formability LDH120 (mm) |
|---|---|
| 1 (Invention) | 24.5 |
| 2 (Invention) | 23.9 |
| 3 (Invention) | 24.3 |
| 4 | |
| 5 | |
| 6 (Invention) | 23.4 |
| 7 | |
| 8 | 22.4 |
| 9 | 21.8 |
| 10 | |
| 11 (Invention) | |
| 12 | |
| 13 | 24.5 |
| 14 | |
| 15 (Invention) | |
| 16 | |
| 17 | 26.6 |
| 18 (Invention) | 26.3 |
| 19 (Invention) | 26.3 |
| 20 (Invention) | 26.0 |
| 21 | 26.8 |
| 22 (Invention) | 26.1 |
| 23 (Invention) | 26.3 |
| 24 (Invention) | 26.4 |
| 25 | 27.1 |
| 26 | 27.3 |

It can be seen that the improvement in the weld quality, particularly for examples 3, 6, 20 and 22, is achieved without any significant change to the formability as measured using the "LDH" value.

It will also be noted that references 25 and 26 correspond to AA6016 type alloys very frequently used in automobile bodywork.

Evaluation of Corrosion Resistance

Figure 6:
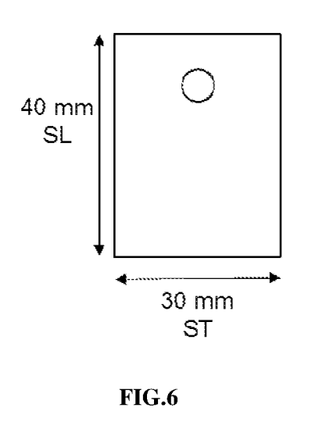
FIG. 6 is a diagram of samples used for tests on resistance to intergranular corrosion.

The inter-granular corrosion test according to standard ISO 11846 consists of submerging the test pieces according to FIG. 6 in a solution of sodium chloride (30 g/l) and hydrochloric acid (10 ml/l) for 24 hrs at a temperature of 30° C. (obtained by holding in a drying oven), after stripping with hot soda (5% by mass) and nitric acid (70% by mass) at ambient temperature. The dimensions of the samples are 40 mm (rolling direction)×30 mm×thickness.

The type and depth of the resulting corrosion are determined by an examination of the micrographic section of the metal. The median and the maximum corrosion depths are measured on each sample.

The results are summarised in Table 6 below.

TABLE 6

| | Inter-granular corrosion | |
|---|---|---|
| Reference | Median corroded depth (μm) | Maximum corroded depth (μm) |
| 1 (Invention) | 126 | 198 |
| 2 (Invention) | 141 | 164 |
| 3 (Invention) | 89 | 146 |
| 4 | 5 | 15 |
| 5 | | |
| 6 (Invention) | 110 | 192 |
| 7 | | |
| 8 | 34 | 42 |
| 9 | 13 | 27 |
| 10 | 89 | 110 |
| 11 (Invention) | 80 | 137 |
| 12 | | |
| 13 | | |
| 14 | | |
| 15 (Invention) | | |
| 16 | 61 | 91 |
| 17 | 32 | 65 |
| 18 (Invention) | 36 | 78 |
| 19 (Invention) | 40 | 72 |
| 20 (Invention) | 30 | 67 |
| 21 | 23 | 42 |
| 22 (Invention) | 55 | 76 |
| 23 (Invention) | 48 | 72 |
| 24 (Invention) | 76 | 101 |
| 25 | 75 | 138 |
| 26 | 115 | 174 |

Once again it can be seen that the improved weld quality, particularly for examples 1, 2, 3 and 6, and especially 18, 19 and 20, and 22, 23 and 24, is achieved without any significant change to the corrosion resistance.

Butt Welding Tests

Butt welding tests to obtain butt welded blanks were performed according to the diagram in FIG. 7. A 1.2 mm thick sheet and a 1.7 mm thick sheet were used. An assembly with alloy 20 according to the invention and an assembly with a reference alloy 26 were tested.

The following laser weld parameters were used:

Laser power: 3 kW

Welding speed: 3.4 m/min

No filler wire

No protective gas

Figure 8:
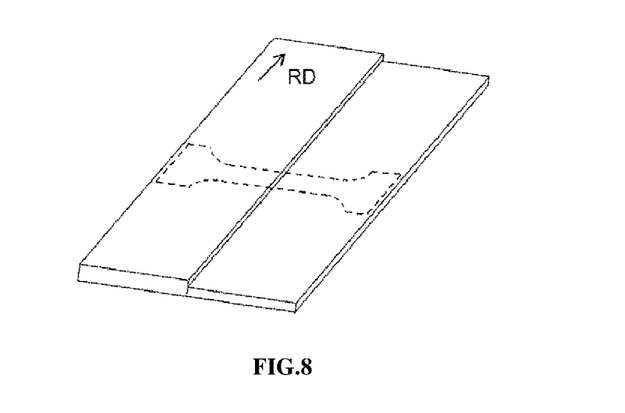
FIG. 8 diagrammatically illustrates how test pieces are taken to measure the mechanical properties of the tailored blank, in which RD stands for the Rolling Direction.

Samples were taken according to FIG. 8 to perform the tension tests. RD indicates the rolling direction.

The mechanical properties obtained are shown in table 7.

TABLE 7

| | Mechanical characteristics | | | | | | |
|---|---|---|---|---|---|---|---|
| | T4 | | | | Welded assembly | | |
| Reference | $Rp_{0.2}$ (MPa) | Rm (MPa) | Ag (%) | A80 (%) | Rm (MPa) | A (100%) | Rm after welding/Rm T4 |
| 20 (Invention) | 110 | 237 | 22.0 | 25.3 | 206 | 2.6 | 0.87 |
| 26 | 115 | 242 | 25.1 | 27.8 | 162 | 0.5 | 0.67 |

The assembly made with an alloy according to the invention has a welding performance evaluated using the "Rm after welding/Rm T4" ratio equal to more than 0.8, which is 30% higher than the value for the reference alloy. Furthermore, the total elongation of the welded assembly increases from 0.5% to 2.6% for the product according to the invention.

The invention claimed is:

1. Method for laser welding of monolithic semi-finished products made from aluminium alloy, without filler wire, comprising:
Supply of at least two aluminium alloy semi-finished products, of which at least one is a rolled sheet with composition (% by weight)
Si: 2.5-14
Fe: 0.05-0.80
Cu: ≤0.20
Mg: 0.05-0.80
Mn: ≤0.70
Cr: ≤0.35
Ti: 0.02-0.30
Sr up to 500 ppm
Na up to 200 ppm
Sb up to 0.15%
other elements <0.05 each and <0.15 total, remainder aluminium, with the condition: 5.2 Fe+1.95 Si−0.5 Cu−Mg≥7.0
Weld the semi-finished aluminium alloy products by laser welding without filler wire.

2. Method according to claim 1, wherein the mechanical properties of said sheet in the delivery temper T4 are $Rp_{0.2}$≤160 MPa, Ag≥18%, A80≥20%.

3. Method according to claim 1, wherein after strain hardening by 2% tension followed by 20 minutes at 180° C., treatment representative of baking paint, said sheet has $Rp_{0.2}$≥170 MPa and Rm≥240 MPa.

4. Method according to claim 1, wherein the Mg content is between 0.20 and 0.80%, and optionally between 0.20 and 0.40%.

5. Method according to claim 1, wherein the Si content is between 2.5 and 10.0, and optionally between 2.7 and 5.0%.

6. Method according to claim 1, wherein the Sr content is between 200 and 400 ppm and/or the Na content is between 20 and 200 ppm and/or the Sb content is between 0.04 and 0.15%.

7. Method according to claim 1, wherein the Fe content is between 0.15 and 0.60%.

8. Method according to claim 1, wherein Cu≤0.10%, optionally Cu≤0.05%, optionally Cu≤200 ppm and optionally Cu≤100 ppm.

9. Method according to claim 1, wherein said rolled sheet is positioned on a side of impact of the laser beam during welding.

10. Method according to claim 1, wherein said laser weld of said semi-finished products made of aluminium alloy without filler wire is done in a butt weld configuration.

11. Method according to claim 10, wherein a product obtained after welding is a tailored blank and wherein at least two of said semi-finished products have different thicknesses and/or different mechanical strengths.

12. Method according to claim 1, wherein said semi-finished products form automobile structure components, or automobile body-in-white components, or automobile vehicle skin components or automobile vehicle door components.

13. Structural, body-in-white, skin or door component of an automobile vehicle, that is composed of several semi-finished products, of which at least one is a rolled sheet with a composition comprising
Si: 2.5-14
Fe: 0.05-0.80
Cu: ≤0.20
Mg: 0.05-0.80
Mn: ≤0.70
Cr: ≤0.35
Ti: 0.02-0.30
Sr up to 500 ppm
Na up to 200 ppm
Sb up to 0.15%
other elements <0.05 each and <0.15 total, remainder aluminium, with the condition: 5.2 Fe+1.95 Si−0.5 Cu−Mg≥7.0
and is assembled using a method according to claim 1.

14. Tailored blank, that is composed of several semi-finished products of which at least one is a rolled sheet with a composition comprising
Si: 2.5-14
Fe: 0.05-0.80
Cu: ≤0.20
Mg: 0.05-0.80
Mn: ≤0.70
Cr: ≤0.35
Ti: 0.02-0.30
Sr up to 500 ppm
Na up to 200 ppm
Sb up to 0.15%
other elements <0.05 each and <0.15 total, remainder aluminium, with the condition: 5.2 Fe+1.95 Si−0.5 Cu−Mg≥7.0
and is assembled by butt welding using a method according to claim 10.

15. Tailored blank according to claim 14, wherein at least two of said semi-finished products have different thickness and/or different mechanical strengths.

* * * * *